May 30, 1967  R. E. HOFFMAN  3,322,392

CAMPER JACK HAVING CABLE HOIST MEANS

Filed Sept. 30, 1965  2 Sheets-Sheet 1

INVENTOR
RICHARD E. HOFFMAN
BY
ATTORNEY

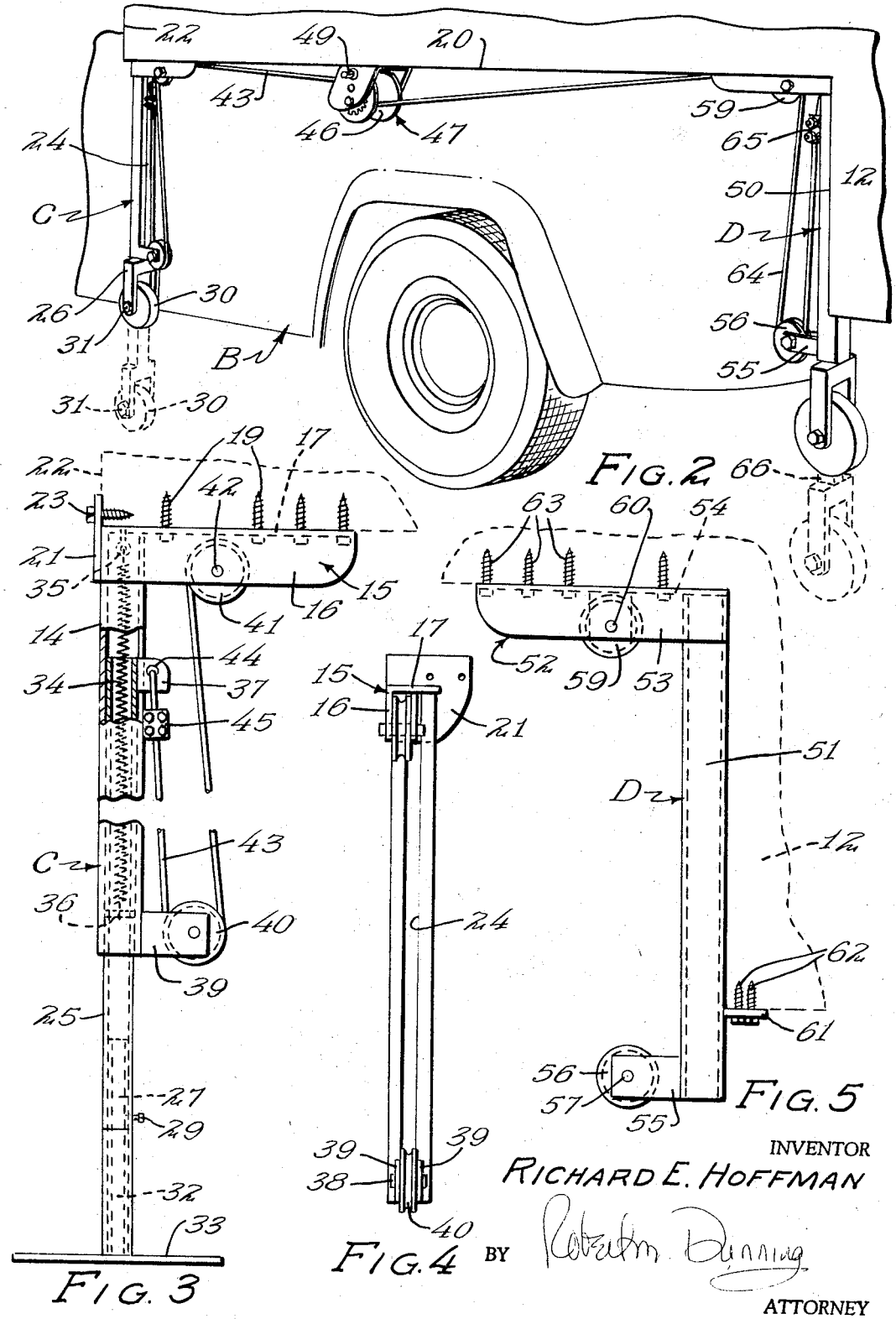

United States Patent Office 3,322,392
Patented May 30, 1967

3,322,392
CAMPER JACK HAVING CABLE HOIST MEANS
Richard E. Hoffman, 2784 E. Margaret St.,
St. Paul, Minn. 55119
Filed Sept. 30, 1965, Ser. No. 491,641
4 Claims. (Cl. 254—47)

This invention relates to an improvement in camper jacks and deals particularly with a means of facilitating the removal of a camping trailer from the open topped body of a pickup truck or the like.

During recent years the number of camping trailers and house trailers sold has greatly increased. One common type of camper comprises a trailer-like body which is designed to fit into the open topped body of a small pickup truck. Campers of this type have the advantage of being relatively inexpensive, and have the added advantage that they actually comprise a camper body on the vehicle itself rather than a separate trailer drawn behind the vehicle.

One of the disadvantages of a camper of this type lies in the fact that they are not easily removed from the vehicle. The bodies necessarily must be made strong enough to stand up for long periods of time, and as a result are necessarily too heavy to handle easily. Thus, the task of removing the camper body from the truck often poses quite a problem. While a block and tackle arrangement may be provided at a terminal point where the camper is usually kept, such a structure is not particularly practical if the camper is to be removed at any other other point.

I have found that camper jacks may be quickly and easily installed on campers of the type in question, which greatly facilitate the removal of the camper from the truck body. The body of the camper normally projects laterally beyond the side edges of the truck. By providing collapsible and extendable members on opposite sides of the body and near opposite ends thereof, such members may be extended into contact with the ground and raise the body of the camper above the body of the truck. When thus raised, the truck may be removed from beneath the camper, and the camper may be held in an elevated position until being replaced upon the truck. Alternatively, after the camper is elevated from the truck body, it may be rolled in a rearward direction until it is clear of the truck. If desired, the camper jacks may be partially collapsed and may be used for supporting the body of the camper in close proximity to the ground, or actually resting upon the ground, so that it may be used independently of the truck.

A feature of the present invention resides in the provision of two pairs of expandable and contractible members, one pair being arranged on each side of the longitudinal centerline of the camper, the pairs of members being spaced apart a distance greater than the width of the truck on which the camper is designed to rest. These members are spaced longitudinally of the truck so as to form a stable support for the camper body. In preferred form, each expansible and contractible member comprises a hollow tubular member secured to extend downwardly from the camper body, and a leg section which is in telescopic relation thereto. Obviously, the relationship of the telescoping members could be reversed. When in a collapsed position, the lower ends of the legs are approximately on a level with the under-surface of the truck body, and accordingly well above the surface of the ground. When in projected position, the legs are in engagement with the ground and the bottom of the camper is raised above the level of the truck body. As a result, the two elements may be easily disconnected in a very short period of time.

An added feature of the present invention lies in the provision of a simple means of operating the jacks. While obviously power-operated means may be used to operate the jacks, in its simplest form, the jacks are extended by means of cables extending from each leg to a ratchet drum or a small winch. Usually the two cables from the jacks on each side of the car are connected to a single winch so that by rotating the winch, two of the legs are simultaneously extended. While it is possible to extend all four of the members simultaneously, the separate raising of each side is simpler and less expensive and has been found entirely practical because of the fact that the camper body need not be lifted to any great extent to be removed from the truck body.

These and other objects and novel features of the present invention will be more clearly and fully set forth in the following specification and claims.

In the drawings forming a part of the specification:

FIGURE 2 is a perspective view showing a side of the camper resting upon a truck, and showing the camper jacks in collapsed and partially extended positions.

FIGURE 3 is an elevational view of one of the jacks, portions being broken away to disclose the construction thereof; the leg portion being shown provided with a flat bearing plate instead of a roller as illustrated in the other views.

FIGURE 4 is an elevational view of the upper portion of the jack, the direction of the view being indicated by the line 4—4 of FIGURE 3.

FIGURE 5 is an elevational view of the upper portion of one of the rear jacks.

Figure 1:
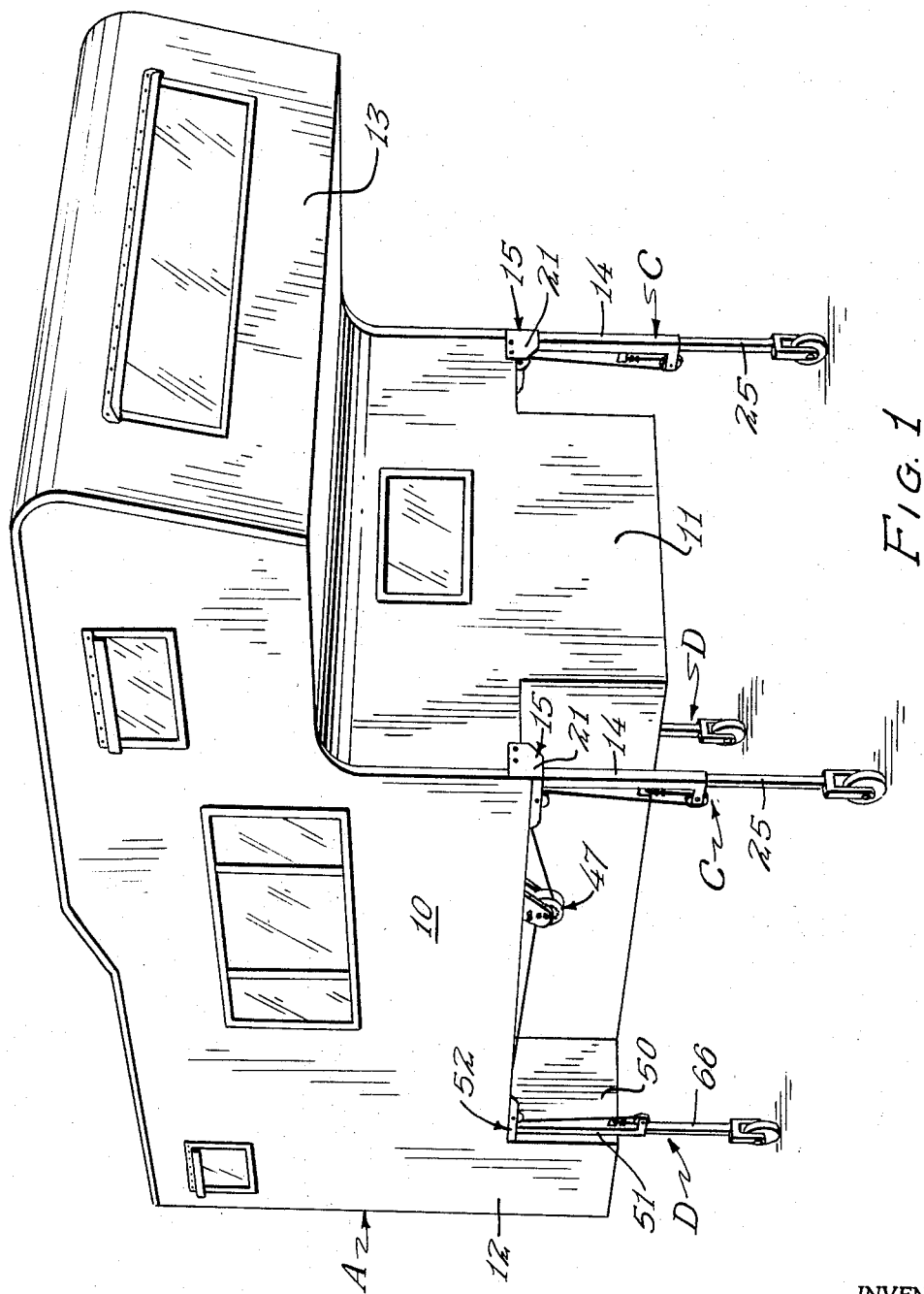
FIGURE 1 is a perspective view of a camper supported by the camper jacks.

The camper A which is illustrated in FIGURE 1 of the drawings is typical of the type of structure the camper jacks are designed to support. The body of the camper includes a central portion 10, the lower portion of which is narrowed as indicated at 11 to fit within the confines of a pickup truck. The rear section 12 is integral with the center section and is merely the full width throughout its height. This rear section 12 is designed to project beyond the rear of the truck body. The camper A also includes a forward portion 13 which is designed to overlie the cab of the truck. All of the body of the camper A with the exception of the narrowed portion 11 at the bottom of the center section 10 are wider than the truck body. As a result, the expandible and contractible members which form the camper jacks may be spaced apart a distance greater than the width of the truck, a portion of which is diagrammatically illustrated in FIGURE 2 at B.

One of the forward camper jacks C is illustrated in FIGURE 3 of the drawings. The camper jack C includes a hollow rectangular post 14 having secured to the upper end thereof an angle member 15 having a vertical flange 16 and a horizontal flange 17 which overlies the upper end of the hollow vertical post 14. Bolts or lag screws such as 19 extend through the horizontal flange 17 and into the undersurface of the laterally projecting sides 20 of the center portion 10 above the narrowed portion 11 thereof. A bracket plate 21 is welded or otherwise secured on a vertical plane at the end of the angle 15 to extend forwardly to engage the forward wall 22 of the center section 10 of the camper body. The bracket plate 21 is secured to the forward wall 22 by any suitable means such as the lag screws 23.

The vertical post 14 is provided with a vertical slot 24 in its rearmost surface, this slot being best illustrated in FIGURE 4 of the drawings.

A leg element 25 is in telescoping relation with the post 14 and is vertically slidable therein. The leg 25 is preferably of rectangular tubular construction of dimensions to slide freely within the post 14. The lower end of the leg 25 may be provided with a bifurcated yoke 26 provided with an upwardly extending shank similar to the shank 27 shown in FIGURE 3 of the drawings which fits into the lower end of the hollow leg 25 and is secured in place by a set screw 29. A wheel 30 is pivotally supported on a transverse pivot shaft 31 extending across the bifurcated end of the yoke 26. Alternatively, the leg 25 may be provided with a similarly shaped downward extension 32 which supports the shank 27 at its upper end, and supports a bearing plate 33 at its lower end. Obviously, the bearing plates 33 are used when it is desired that the camper remain in a stationary position or where the camper is resting upon soft ground.

The post 25 and leg 14 are normally drawn toward contacted position by means of a spring 34 secured at its upper end to an eye bolt 35 extending through the flange 17 at the top of the post 14, and anchored at its lower end to a transverse pin 36 extending between the sides of the leg 25.

A lug 37 is provided at the upper end of the leg 25 and extending through the slot 24. A pair of parallel ears or plates 39 project rearwardly from the slotted side of the post 14 at its lower end. As indicated in FIGURE 4 of the drawings, the plates 39 are on opposite sides of the slot 24. A pulley 40 is pivotally supported on a pivot shaft 38 extending between the plates 39. A second pulley 41 is supported on a pivot shaft 42 extending normally to the vertical flange 16 of the angle member 15.

A flexible cable 43 has an end looped through an aperture 44 in the lug 37 and the end of the cable is held in looped form by cable clamps 45. The cable 43 extends downwardly between the bracket plates 39, about the pulley 40, and up and over the pulley 41. As indicated in FIGURE 2 of the drawings, the cable 43 is wound about the drum 46 of a winch 47 and is anchored thereto. The winch is of the ratchet type and may be rotated in either direction by suitable manipulation of the reversible ratchet. The winch is provided with a drive shaft 49 designed to accommodate a crank handle by means of which the winch may be rotated. As winches of this type are in common use, the details of construction have been omitted for the sake of simplicity.

The rear jack D differs from the front jack C only in the construction of the upper post member, the rear jack D being designed to fit against the forward side 50 of the rear camper section 12. The post section of the rear jack D is indicated in FIGURE 5 of the drawings. It comprises a hollow rectangular post 51 having an open lower end and having at its upper end an angle member 52 including a vertical flange 53 and a horizontal flange 54 which overlies the top of the post 51. The forward side of the post 51 is slotted to provide a slot such as 24. A pair of ears 55 project forwardly from the post on opposite sides of the slot and act to support a pulley 56 on a transverse pivot shaft 57, the structure being identical to that shown in FIGURE 4. A second pulley 59 is supported on a pivot shaft 60 normal to the vertical flange 53 of the angle member 52.

As will be seen, the upper portion of the bumper jack D differs from the upper portion of the jack C only in omitting the bracket plate 21 and substituting therefor a horizontal bracket 61 extending from the rear side of the post 51. This bracket 61 is designed to be secured to the under-surface of the rear section 12 of the trailer by lag screws 62 or other suitable means. The horizontal flange 54 of the angle member 52 is secured to the undersurface of the wider portion of the central section 10 by lag screws 63 or other suitable means.

As indicated in FIGURE 2, a cable 64 is anchored at 65 to a lug extending through the slot in the post 51 and attached to the relatively slidable leg section 66 telescoped into the lower end of the post 51. The cable 64 extends between the ears 55 and about the pulley 56, and then extends up and over the pulley 59. The cable is anchored to the drum 46 of the winch 47 so as to wind on this drum simultaneously with the previously described cable 43.

The operation of the apparatus is believed obvious from the foregoing description. When it is desired to remove the camper A from the truck B, the winches 47 on opposite sides of the camper are operated either simultaneously or alternately until the camper is high enough to clear the body of the truck B. The truck may then be removed from beneath the camper, or the camper may be rolled from over the truck. The replacement of the camper on to the truck is a reversal of this procedure. If it is desired to use the camper independently of the truck, the jacks are collapsed to the desired extent to support the camper at the desired elevation.

In accordance with the patent statutes, I have described the principles of construction and operation of my improvement in camper jacks, and while I have endeavored forth the best embodiment thereof, I desire to have it understood that changes may be made within the scope of the following claims without departing from the spirit of my invention.

I claim:

1. A camper jack for use in conjunction with a trailer adapted to be supported on the open topped body of a pick-up truck, the trailer being generally rectangular in plan and extending beyond the sides of the truck, a pair of hollow tubular members supported in vertical relation extending downwardly from said trailer near opposite ends thereof and spaced apart a distance greater than the width of the truck body, a leg slidably supported in each of said hollow tubular members and engageable with the ground, an elongated vertical slot in each of said tubular members, and a resilient means urging each leg into its corresponding tubular member, an operating lug on each of said legs extending through a corresponding slot,
a pulley arranged on a horizontal axis below said slot and attached to the lower end of each tubular member,
a cable secured to each lug and extending through said pulley, and
means connected to said cables to draw each said pulley toward the corresponding lug.

2. The structure of claim 1 and including a ratchet drum on each side of said trailer upon which the cables on each side of said trailer are simultaneously wound.

3. The structure of claim 2 and including an angle member extending horizontally from each said tubular member at the upper end thereof attached to said trailer, a second pulley supported by each angle member and said cable extending through said second pulley between each said first named pulley and said winch.

4. A camper jack for use in conjunction with a trailer adapted to be supported on the open topped body of a pickup truck, the trailer being generally rectangular in plan and extending beyond the sides of the truck, a pair of hollow tubular members supported in vertical relation extending downwardly from said trailer near opposite ends thereof and spaced apart a distance greater than the width of the truck body, a leg slidably supported in each of said hollow tubular members and engageable with the ground, an elongated vertical slot on each of said tubular members, operating means on the upper end of each leg extending through a corresponding one of said slots, resilient means normally urging each said leg upwardly in said tubular member, a pulley at the lower end of each said tubular member beneath said operating means, a winch supported on said trailer between the hollow tubular members on each side thereof, a flexible member extending from each said operating means downwardly about said pulley therebeneath, and to the winch positioned between said tubular members by means of which said legs may be drawn downwardly in said tubular members.

References Cited

UNITED STATES PATENTS

| | | | |
|---|---|---|---|
| 945,793 | 1/1910 | Monk | 254—148 |
| 1,541,290 | 6/1925 | Streit | 254—148 |
| 2,238,411 | 4/1941 | Conklin | 254—148 |
| 2,519,364 | 8/1950 | Fredholm | 254—86 |
| 3,026,090 | 3/1962 | Anderson | 254—148 X |
| 3,139,266 | 6/1964 | Tew | 254—47 |
| 3,201,087 | 8/1965 | Dalton | 254—86 |
| 3,248,083 | 4/1966 | De Gennaro et al. | 254—47 |
| 3,248,084 | 4/1966 | Hammond | 254—86 |

WILLIAM FELDMAN, *Primary Examiner.*

MILTON S. MEHR, *Examiner.*